3,339,082
A.C. POWER SUPPLY SYSTEM HAVING ALTERNATE SOURCES OF SUPPLY

Earl C. Rhyne, Jr., Millis, Mass., assignor to Dielectric Products Engineering Co., Inc., a corporation of Michigan, having a division, the Warren Manufacturing Company, Littleton, Mass.
Filed Feb. 26, 1965, Ser. No. 435,479
10 Claims. (Cl. 307—66)

The present invention relates to an inverter circuit. More particularly, the invention relates to an inverter circuit for use with telephone ringing equipment.

An inverter circuit of the type described generally operates from a direct voltage battery which is in turn charged by a charging generator operated from a utility or power supply line. Such an inverter places a heavy load on the battery and it would be desirable to operate the inverter directly from a utility or power supply line without the necessity for rectifying the voltage from the utility line and then inverting it again. However, the voltage from utility lines or power supply lines does not meet the reliability standards required for telephone systems. Thus, the use of voltages directly from utility or power supply lines has heretofore been avoided.

An object of the present invention is to provide a new and improved inverter circuit.

Another object of the present invention is to provide an inverter circuit which draws current for its output from a utility or power supply line in preference to the inverter circuit as such, but which draws current directly from the inverter circuit in the absence of voltage from the utility or power supply line. Thus, the more efficient transmission from the utility or power supply line is utilized directly while the utility or power supply line supplies voltage, but the more reliable voltage from the inverter circuit is utilized in the absence of voltage from the utility or power supply line.

Still another object of the present invention is to provide an inverter circuit of the aforedescribed type which is easily synchronizable with a utility or power supply line.

Figure 1A:
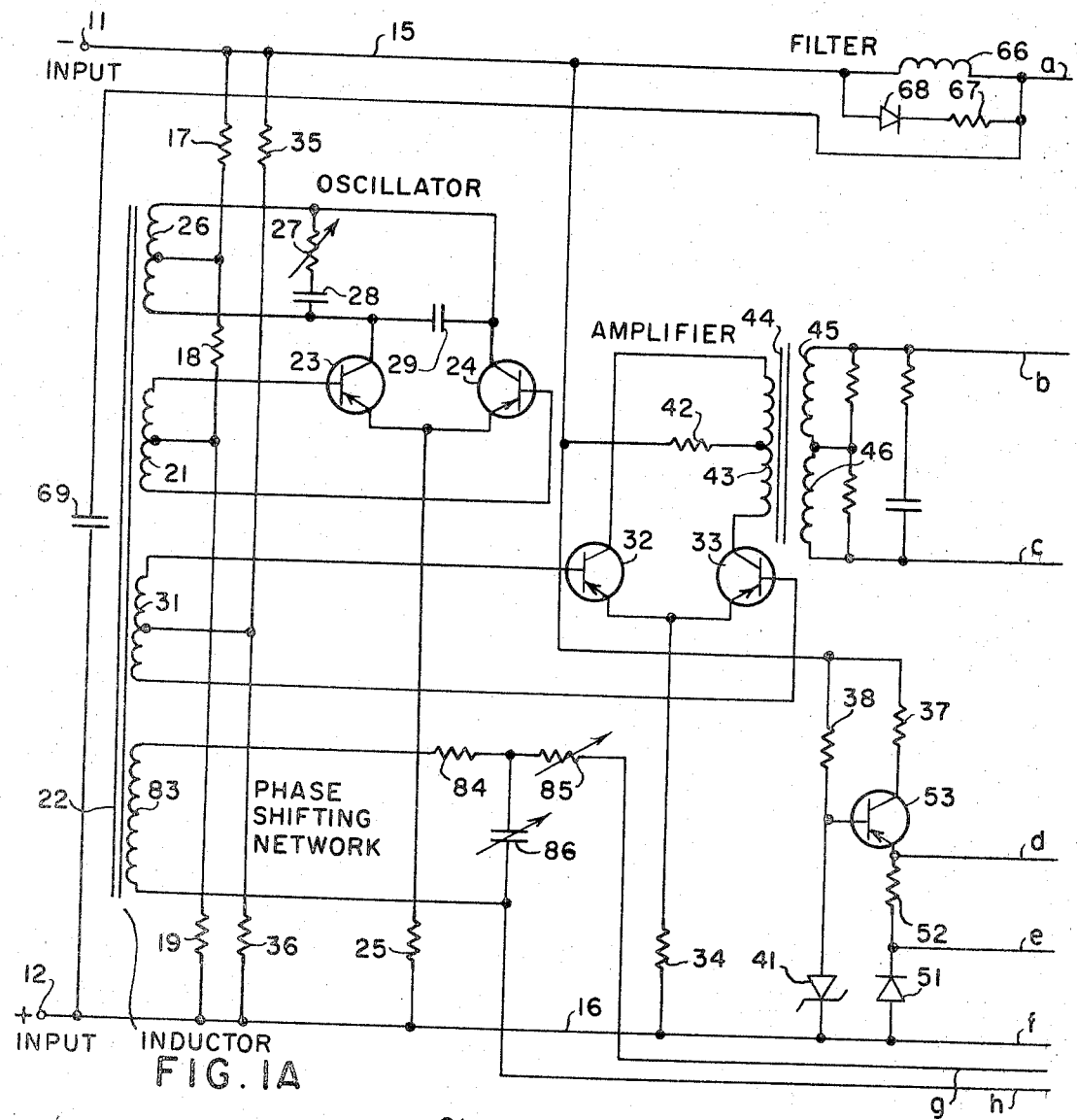
Figure 2:
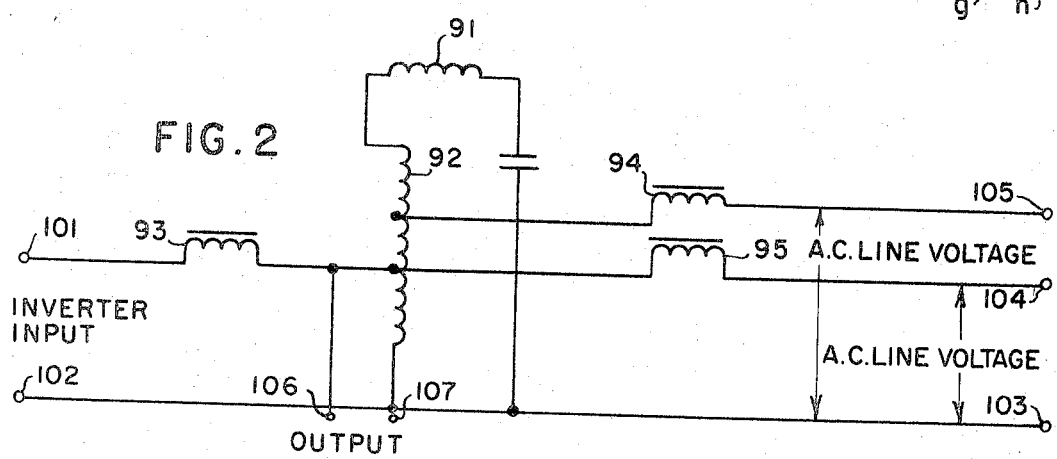
Figure 1B:
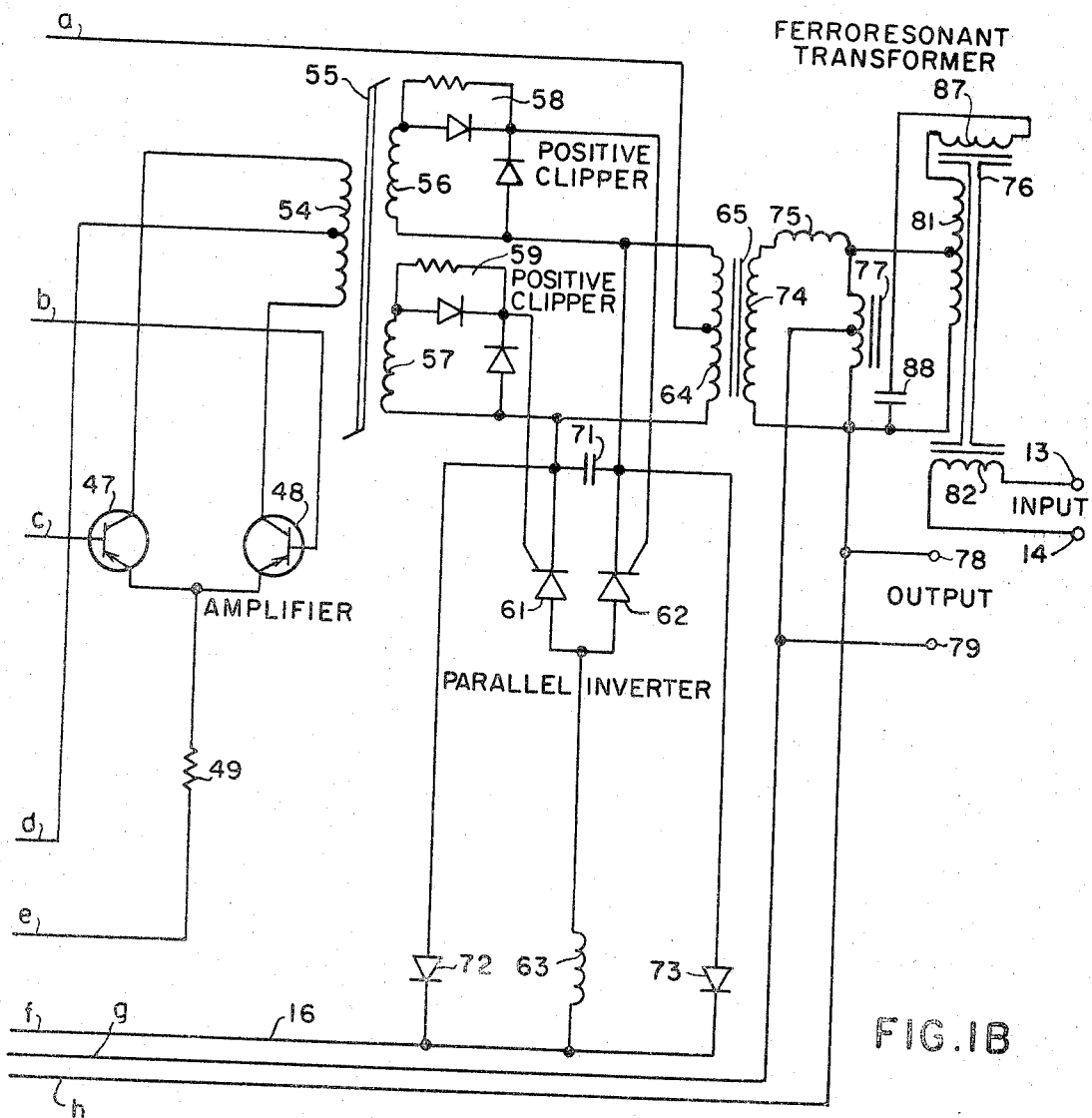

Other objects and advantages of the invention will become apparent from the following detailed description of a circuit arrangement embodying features of the invention, when read in the light of the accompanying drawings wherein:

FIG. 1, which comprises FIG. 1A and FIG. 1B, is a schematic circuit diagram of an embodiment of an inverter circuit of the present invention; and FIG. 2 is a schematic circuit diagram of an embodiment of a ferroresonant system which may be utilized in the inverter circuit of the present invention.

The inverter circuit of FIG. 1 has two inputs. One of the inputs comprises a pair of input terminals 11 and 12 to be connected to a telephone system battery or other direct current source of 50 volts. Another of the inputs comprises another pair of input terminals 13 and 14 to be connected to a 60 cycle source. A line 15 has a voltage of negative polarity impressed upon it and a line 16 has a voltage of positive polarity impressed upon it by the source at the input terminals 11 and 12.

Three resistors 17, 18 and 19 form a voltage divider. The junction of the resistors 18 and 19 is connected to the center tap of a positive feedback winding 21 on an inductor 22. The voltage thus biases the base electrodes of two transistors 23 and 24 through the ends of the winding 21.

The transistors 23 and 24 are connected in an oscillator circuit. Each of the transistors 23 and 24, as do all the transistors in the circuit arrangement of the present invention, has emitter, collector and base electrodes. An emitter resistor 25 connects the emitter electrodes of the transistors 23 and 24 to the positive line 16. A winding 26 on the inductor 22 is connected at one end to the collector electrode of the transistor 23 and is connected at its opposite end to the collector electrode of the transistor 24. The winding 26 receives at its center tap energizing voltages for the collector electrodes of the transistors 23 and 24 from the junction of the resistors 17 and 18. A resistor 27, capacitors 28 and 29, and winding 26 on inductor 22 tune the oscillator, in which the transistors 23 and 24 are connected, to 60 cycles per second.

An output winding 31 on the inductor 22 energizes the base electrodes of transistors 32 and 33. The transistors 32 and 33 are connected in an oscillator amplifier or common emitter circuit. The emitter electrodes of the transistors 32 and 33 are connected to the positive line 16 by a resistor 34. A resistor 35 and a resistor 36 form another voltage divider between the lines 15 and 16 to bias the base electrodes of the transistors 32 and 33 through a center tap on the winding 31.

A resistor 38 and a Zener diode 41 are connected in series between the lines 15 and 16. The collector electrodes of the transistors 32 and 33 are energized through a resistor 42, a center tap of a winding 43 on a transformer 44 and the ends of the winding 43 which are connected to the collector electrodes.

The output of the oscillator amplifier circuit appears across windings 45 and 46 of the transformer 44 and at the base electrodes of transistors 47 and 48. The transistors 47 and 48 are connected in an oscillator amplifier or common emitter circuit. A resistor 49 is connected between the emitter electrodes of transistors 47 and 48 and the junction of a diode 51 and a resistor 52.

The diode 51 and the resistor 52 are connected in the emitter circuit of a transistor 53. The base electrode of the transistor 53 is energized through the junction of the resistor 38 and the Zener diode 41. The collector electrode of the transistor 53 is energized through a resistor 37. The base voltage of the transistor 53 is kept substantially constant by virtue of the Zener diode 41 so that the emitter voltage of said transistor is also substantially constant.

The voltage at the collector electrodes of the transistors 47 and 48 is derived from the emitter electrode of the transistor 53 via the center tap of a winding 54 of a saturable transformer 55. One end of the winding 54 is connected to the collector electrode of the transistor 47 and the other end of said winding is connected to the collector electrode of the transistor 48.

The output of the amplifier comprising the transistors 47 and 48 causes the core of the transformer 55 to saturate after approximately 120 degrees in each half-cycle. The transformer 55 is so dimensioned that the output at its secondary windings 56 and 57 comprise square positive pulses and square negative pulses approximately 120 degrees on each side.

The pulses provided by the windings 56 and 57 are clipped by positive clipping circuits 58 and 59 and are applied across the respective cathodes and gates of two silicon controlled rectifiers 61 and 62 in parallel inverter connection. An inductor 63 is connected between the anodes of the SCR's 61 and 62 and the positive line 16. The cathodes of the SCR's 61 and 62 are energized through the ends of a winding 64 on a transformer 65; the cathode of the SCR 61 being connected to one end of said winding and the cathode of the SCR 62 being connected to the other end of the said winding. The winding 64 has a center tap connected to the line 15 through a filter comprising an inductor 66, a resistor 67, a diode 68 and a capacitor 69.

Parallel inverter operation of the SCR's 61 and 62 is achieved by a commutating capacitor 71 and inductive current discharge diodes 72 and 73. The capacitor 71 is connected between the cathodes of the SCR's 61 and 62. The diode 72 is connected between the cathode of the SCR 61 and the positive line 16 and the diode 73 is connected between the cathode of the SCR 62 and said positive line. The output of the parallel inverter circuit appears across a winding 74 of the transformer 65.

An inductor 75 provides series reactance for a ferroresonant transformer 76 which produces an output voltage which is applied across an output autotransformer 77. The output of the autotransformer 77 is connected across a pair of output terminals 78 and 79. It will be obvious that the output transformer 77 is necessary only for the purpose of providing the desired output voltage.

The ferroresonant transformer 76 has one operating winding 81 and a second input winding 82 which is connected across a 60 cycle source via the input terminals 13 and 14. Thus, there are two inputs to the ferroresonant transformer 76, one to the choke 75 and the other to the winding 82. A harmonic compensating winding 87 is connected in series with the operating winding 81 of the ferroresonant transformer 76 and is required to produce a good sine wave output. The principal function of the harmonic compensating winding is to filter out third harmonics and odd harmonics from the square wave provided and thus insure the provision of a good sine wave at the output terminals 78 and 79.

The ferroresonant transformer 76 of FIG. 1, as well as the embodiment of ferroresonant transformer of FIG. 2, may be put into ferroresonance from a plurality of sources. As shown in FIG. 1, there is a leakage gap between the input winding 82 and the operating winding 81 of the ferroresonant transformer 76. The ferroresonant operation or action may be obtained either by the ferroresonant transformer operating winding 81, a ferroresonant capacitor 88 and the inductor or series reactor or choke 75, or by the operating winding 81, the ferroresonant capacitor 88 and the leakage reactance of the shunt gap between the input winding 82 and the said operating winding; the leakage reactance serving the same function as the series reactor or choke 75, in such case.

The ferroresonant operation or action requires that the core of the ferroresonant transformer 76 be in saturation and that the inductive or equivalent reactance due to the core be in parallel resonance with the ferroresonant capacitor 88. A series reactance must be provided in series between an A.C. voltage supply source and the ferroresonant parallel resonant tank circuit. When the A.C. voltage of the supply source is above the regulated magnitude, the current flow from the tank circuit is inductive and inductive current flowing through the series reactor or choke 75 produces a voltage decrease between the tank circuit and the A.C. supply voltage source thereby enabling the voltage across the load to be maintained constant.

When the A.C. supply voltage is below the regulated magnitude, the core of the ferroresonant transformer 76 comes out of saturation and the current flow from the tank circuit is capacitive instead of inductive. The capacitive current flowing through the series reactor or choke 75 permits the voltage between the tank circuit and the A.C. supply voltage source to increase to a magnitude greater than that of said A.C. supply voltage.

When the A.C. supply voltage is applied to the input windings 13 and 14, the leakage reactance of the ferroresonant transformer 76 provides the same function as the foregoing although there is no coil to serve the same function as the series reactor or choke 75. The leakage reactance of the ferroresonant transformer 76 is inherent in the core structure as built and is essential for ferroresonant operation, or action.

Thus, in accordance with the foregoing, it is seen that the tank circuit comprising the operating winding 81 of the ferroresonant transformer 76 and the ferroresonant capacitor 88 may have ferroresonant operation or action either between the input lines 13 and 14 and said tank circuit due to the leakage reactance resulting from the core shape, or between the secondary voltage from the winding 74 and said tank circuit, with the ferroresonant series reactance being provided by the series reactor or choke 75.

The input at the input terminals 13 and 14 is synchronized with the phase and frequency of the oscillator comprising the transistors 23 and 24. The inductor 22 comprises a control winding 83 which is connected to the output terminals 78 and 79 through a phase shifting network comprising a resistor 84, a variable resistor 85, and a variable capacitor 86. The resistor 84 may have a resistance of about 68 kilohms and the capacitor 86 may have a capacitance of 0.1 microfarad. The resistor 85 is variable and by adjustment may reduce the input current at the input terminals 11 and 12 to zero when an A.C. voltage is applied at the input terminals 13 and 14. The variable resistor 85 may also feed charging current back into the battery through the inverter by correctly setting the resistance value of said resistor.

In operation, the oscillator comprising the transistors 23 and 24 is operative at a phase and frequency primarily determined by the tuning network 22, 26, 27, 28, 29, and influenced by the phase shifting network 22, 83, 84, 85, 86. The output of the oscillator is amplified by the amplifier comprising the transistors 32 and 33 and then by the amplifier comprising the transistors 47 and 48.

The output of the amplifier comprising the transistors 47 and 48, when applied to the saturable transformer 55 will saturate once during each half cycle, preferably at about 120 degrees, and will be clipped bp the clipping circuits 58 and 59 so as to produce a substantially square wave over 120 degrees, a zero voltage over the next 60 degrees, and a square wave in the opposite direction over the next 120 degrees with a zero voltage for the remaining 60 degrees of each cycle. These voltages are applied to the gates of the SCR's 61 and 62 of the parallel inverter.

The outputs of the SCR's 61 and 62 of the parallel inverter are then applied to the ferroresonant transformer 76 through the transformer 65. The series reactance in the feroresonant transformer 76 is supplied by the inductor 75. A ferroresonant transformer similar to the transformer 76 is described more fully in my copending patent application Ser. No. 288,764, filed June 18, 1963. The output voltage of the ferroresonant transformer 76 is then applied to the autotransformer 77 and thence to the output terminals 78 and 79. The output voltage of the ferroresonant transformer 76 is also fed back through the phase shifting network 22, 83, 84, 85, 86.

The ferroresonant transformer 76 tends to keep the output voltage constant in the usual manner. The phase shifting network 22, 83, 84, 85, 86 can vary the condition of the phase of the parallel inverter according to the voltage appearing across the battery or input terminals 11 and 12. This may be done to hold the voltage across the battery constant. The sync signal actually overdrives the oscillator. The sync signal therefore takes over the function of the tank circuit. The inverter circuit of the present invention thus offers line synchronization without any timing problem. When a line voltage is applied to the input terminals 13 and 14, the inverter circuit synchronizes to the line regardless of its phase. This is accomplished because the oscillator inductance is connected to the ferroresonant load terminals and synchronizes the operation of the oscillator including the transistors 23 and 24 because the input voltage is such as to overdrive the oscillator.

In operation, the load draws preferentially from the 60 cycle source connected to the input terminals 13 and 14, but starts to draw from the inverter circuit after such 60 cycle source has dropped out.

The inputs 11 and 12 and 13 and 14 are not independent of each other. In fact, the transformer 65 may have a voltage applied from the ferroresonant transformer 76. This voltage may have been derived from the A.C. source connected to the input terminals 13 and 14. The transformer 65 may then supply this voltage to the positive line 16 through the diodes 72 and 73 or through the SCR's 61 and 62, and to the negative line 15 through the center tap of its winding 64. An A.C. voltage thus operates as a battery charger and the diodes 72 and 73 perform as a full-wave rectifier.

The phase shifting network 22, 83, 84, 85, 86 may be varied according to the voltage across the battery connected to the input terminals 11 and 12 so as to hold the battery voltage constant while feeding the battery as a load and floating the battery with the A.C. source at the input terminals 13 and 14. Thus, the battery connected to the input terminals 11 and 12 is kept floating at a particular voltage and can operate as a source at such particular voltage as a standby in the event of power failure or failure of the A.C. source connected to the input terminals 13 and 14.

Thus, it is an outside source independent from the battery which supplies power for the inverter circuit when the A.C. source is connected to the input terminals 13 and 14. At such time, the oscillator is substantially driven by the input A.C. voltage.

Since the transformer 76 is ferroresonant, if, for example, a short circuit should occur across the output, the ferroresonance will prevent interference with the operation of the inverter circuit. This condition, which is the worst condition, may be simulated if the input signal at the input terminals 13 and 14 is 180 degrees out of phase with the inverter circuit. In this condition the inverter circuit will not be adversely affected. If the A.C. signal then becomes less than 180 degrees out of phase with the inverter circuit, the condiiton which prevails is not as bad as the worst condition.

In the event of a short circuit in the line attempting to feed the inverter circuit, the effect of the short circuit will be reduced null by the ferroresonant transformer 76 and will not interfere with the operation of the inverter circuit. It will interfere to the extent of lowering the output voltage only.

FIG. 2 illustrates another embodiment of a ferroresonant transformer system. In FIG. 2, the transformer system comprises windings 91 and 92 without series reactors. The series reactors are supplied by inductors 93, 94 and 95.

Input terminals 101 and 102 may constitute an input, for example, from the inverter circuit. Input terminals 103 and 104 may constitute an input from an A.C. source. Input terminals 103 and 105 may constitute an input from another higher voltage A.C. source. Output terminals 106 and 107 provide the output voltage for a load connected between them. The output terminals 106 and 107 are connected across a portion of the winding 92 of the ferroresonant transformer system. The ferroresonant transformer system of FIG. 2 tends to keep the output voltage constant in the usual manne.

The inputs of the embodiment of FIG. 2 are not independent of each other, but may receive voltage from the ferroresonant transformer system, which voltage may have been derived from the A.C. source.

While the invention has been described by means of a specific example and in a specific embodiment, I do not wish to be limited thereto, for obvious modifications will occur to those skilled in the art without departing from the spirit and scope of the invention.

I claim:

1. An inverter circuit, comprising
a first pair of input terminals for a D.C. battery adapted to be charged by said inverter circuit;
a second pair of input terminals for an A.C. line voltage;
inductor means having a core and a plurality of windings inductively coupled to said core;
voltage divider means connected across said first pair of input terminals, said voltage divider means having taps connected to selected ones of the windings of said inductor means;
oscillator means for producing an A.C. voltage, said oscillator means having a tuning circuit for tuning said oscillator means to a selected frequency, said tuning circuit including a winding of said inductor means connected to said voltage divider means;
pulse shaping means coupled to said oscillator means for converting the A.C. voltage produced by said oscillator means to a substantially square wave, said pulse shaping means including parallel inverter means;
ferroresonant transformer means having a first input coupled to the parallel inverter means of said pulse shaping means, a second input coupled to said second pair of input terminals and an output;
means for deriving an output voltage from the output of said ferroresonant transformer means;
phase shifting means including another winding of said inductor means; and
feedback means for feeding back the output voltage of said ferroresonant transformer means to said phase shifting means.

2. An inverter circuit as claimed in claim 1, wherein said second input terminals are coupled to said first input terminals through said ferroresonant transformer means and the parallel inverter means of said pulse shaping means so that said A.C. line voltage operates to charge said D.C. battery.

3. An inverter circuit, comprising
a first pair of input terminals for a D.C. battery adapted to be charged by said inverter circuit;
a second pair of input terminals for an A.C. line voltage;
inductor means having a core and a plurality of windings inductively coupled to said core;
voltage divider means connected across said first pair of input terminals, said voltage divider means having taps connected to selected ones of the windings of said inductor means;
oscillator means for producing an A.C. voltage, said oscillator means having a tuning circuit for tuning said oscillator means to a selected frequency, said tuning circuit including a winding of said inductor means connected to said voltage divider means;
pulse shaping means coupled to said oscillator means for converting the A.C. voltage produced by said oscillator means to a substantially square wave, said pulse shaping means including parallel inverter means;
ferroresonant transformer means having a first input coupled to the parallel inverter means of said pulse shaping means, a second input coupled to said second pair of input terminals and an output;
means for deriving an output voltage from the output of said ferroresonant transformer means;
variable phase shifting means including another winding of said inductor means; and
feedback means for feeding back the output voltage of said ferroresonant transformer means to said phase shifting means, said variable phase shifting means being variable in accordance with the voltage across said D.C. battery to hold said voltage of said battery substantially constant while feeding the said battery as a load and floating the said battery with said A.C. line voltage.

4. An inverter circuit, comprising
a first pair of input terminals for a D.C. battery adapted to be charged by said inverter circuit;
a second pair of input terminals for an A.C. line voltage;
inductor means having a core and a plurality of windings inductively coupled to said core;

voltage divider means connected across said first pair of input terminals, said voltage divider means having taps connected to selected ones of the windings of said inductor means;

oscillator means for producing an A.C. voltage, said oscillator means having a tuning circuit for tuning said oscillator means to a selected frequency, said tuning circuit including a winding of said inductor means connected to said voltage divider means;

pulse shaping means coupled to said oscillator means for converting the A.C. voltage produced by said oscillator means to a substantially square wave, said pulse shaping means including parallel inverter means;

ferroresonant transformer means having a first input coupled to the parallel inverter means of said pulse shaping means, a second input coupled to said second pair of input terminals and an output;

means for deriving an output voltage from the output of said ferroresonant transformer means;

variable phase shifting means including another winding of said inductor means; and feedback means for feeding back the output voltage of said ferroresonant transformer means to said phase shifting means, said variable phase shifting means being variable in accordance with the voltage across said D.C. battery to hold said voltage of said battery substantially constant while feeding the said battery as a load and floating the said battery with said A.C. line voltage, variation of said variable phase shifting means causing variation of the tuning circuit of said oscillator means to vary said output voltage.

5. An inverter circuit, comprising
a first pair of input terminals for a D.C. battery adapted to be charged by said inverter circuit;
a second pair of input terminals for an A.C. line voltage;
inductor means having a core and a plurality of windings inductively coupled to said core;
voltage divider means connected across said first pair of input terminals, said voltage divider means having taps connected to selected ones of the windings of said inductor means;
oscillator means for producing an A.C. voltage, said oscillator means having a tuning circuit for tuning said oscillator means to a selected frequency, said tuning circuit including a winding of said inductor means connected to said voltage divider means;
pulse shaping means coupled to said oscillator means for converting the A.C. voltage produced by said oscillator means to a substantially square wave, said pulse shaping means including parallel inverter means;
ferroresonant transformer means having a first input coupled to the parallel inverter means of said pulse shaping means, a second input coupled to said second pair of input terminals and an output;
means for deriving an output voltage from the output of said ferroresonant transformer means;
variable phase shifting means including another winding of said inductor means; and
feedback means for feeding back the output voltage of said ferroresonant transformer means to said phase shifting means, said variable phase shifting means being variable in accordance with the voltage across said D.C. battery to vary the phase condition of the parallel inverter means of said pulse shaping means to hold said voltage of said battery substantially constant.

6. An inverter circuit, comprising
a first pair of input terminals for a D.C. battery adapted to be charged by said inverter circuit;
a second pair of input terminals for an A.C. line voltage;

inductor means having a core and a plurality of windings inductively coupled to said core;
voltage divider means connected across said first pair of input terminals, said voltage divider means having taps connected to selected ones of the windings of said inductor means;
oscillator means for producing an A.C. voltage, said oscillator means having a tuning circuit for tuning said oscillator means to a selected frequency, said tuning circuit including a winding of said inductor means connected to said voltage divider means;
pulse shaping means coupled to said oscillator means for converting the A.C. voltage produced by said oscillator means to a substantially square wave, said pulse shaping means including parallel inverter means;
ferroresonant transformer means having a first input coupled to the parallel inverter means of said pulse shaping means, a second input coupled to said second pair of input terminals and an output;
means for deriving an output voltage from the output of said ferroresonant transformer means;
phase shifting means including another winding of said inductor means; and
feedback means for feeding back the output voltage of said ferroresonant transformer means to said phase shifting means, said inverter circuit synchronizing to said A.C. line voltage.

7. An inverter circuit, comprising
a first pair of input terminals for a D.C. battery adapted to be charged by said inverter circuit;
a second pair of input terminals for an A.C. line voltage;
inductor means having a core and a plurality of windings inductively coupled to said core;
voltage divider means connected across said first pair of input terminals, said voltage divider means having taps connected to selected ones of the windings of said inductor means;
oscillator means for producing an A.C. voltage, said oscillator means having a tuning circuit for tuning said oscillator means to a selected frequency, said tuning circuit including a winding of said inductor means connected to said voltage divider means;
pulse shaping means coupled to said oscillator means for converting the A.C. voltage produced by said oscillator means to a substantially square wave, said pulse shaping means including parallel inverter means;
ferroresonant transformer means having a first input coupled to the parallel inverter means of said pulse shaping means, a second input coupled to said second pair of input terminals and an output;
means for deriving an output voltage from the output of said ferroresonant transformer means;
phase shifting means including another winding of said inductor means; and
feedback means for feeding back the output voltage of said ferroresonant transformer means to said phase shifting means, said A.C. line voltage overdriving said oscillator means and the tuning circuit of said oscillator means being coupled to said ferroresonant transformer means through said inductor, said variable phase shifting means and said feedback means so that said oscillator means is synchronized to said A.C. line voltage.

8. An inverter circuit, comprising
a first pair of input terminals for a D.C. battery adapted to be charged by said inverter circuit;
a second pair of input terminals for an A.C. line voltage;
inductor means having a core and a plurality of windings inductively coupled to said core;
voltage divider means connected across said first pair of input terminals, said voltage divider means having taps connected to selected ones of the windings of said inductor means;

oscillator means for producing an A.C. voltage, said oscillator means having a tuning circuit for tuning said oscillator means to a selected frequency, said tuning circuit including a winding of said inductor means connected to said voltage divider means;

pulse shaping means coupled to said oscillator means for converting the A.C. voltage produced by said oscillator means to a substantially square wave, said pulse shaping means including parallel inverter means;

ferroresonant transformer means having a first input coupled to the parallel inverter means of said pulse shaping means, a second input coupled to said second pair of input terminals and an output;

means for deriving an output voltage from the output of said ferroresonant transformer means;

phase shifting means including another winding of said inductor means; and feedback means for feeding back the output voltage of said ferroresonant transformer means to said phase shifting means; and a load connected to said means for deriving an output voltage from the output of said ferroresonant transformer means, said load drawing from said A.C. line voltage during the application of said A.C. line voltage to said second pair of input terminals and drawing from said inverter circuit during the non-application of the said A.C. line voltage to the said second pair of input terminals.

9. An inverter circuit, comprising
a first pair of input terminals for a D.C. battery adapted to be charged by said inverter circuit;
a second pair of input terminals for an A.C. line voltage;
inductor means having a core and a plurality of windings inductively coupled to said core;
voltage divider means connected across said first pair of input terminals, said voltage divider means having taps connected to selected ones of the windings of said inductor means;
oscillator means for producing an A.C. voltage, said oscillator means having a tuning circuit for tuning said oscillator means to a selected frequency, said tuning circuit including a winding of said inductor means connected to said voltage divider means;
pulse shaping means coupled to said oscillator means for converting the A.C. voltage produced by said oscillator means to a substantially square wave, said pulse shaping means including parallel inverter means;
ferroresonant transformer means having a first winding, a second winding connected in series circuit arrangement with said first winding and having at least one intermediate tap thereon, said series circuit arrangement having an end at said first winding and an end at said second winding, a first series reactor connected to an intermediate tap on said second winding, a first input connected to said first series reactor and to the ends of said series circuit arrangement and coupled to the parallel inverter means of said pulse shaping means, a second series reactor connected to said intermediate tap on said second winding, a second input connected to said second series reactor and to the ends of said series circuit arrangement and coupled to said second pair of input terminals, and an output connected between the ends of said series circuit arrangement and said intermediate tap on said second winding;

means for deriving an output voltage from the output of said ferroresonant transformer means;

phase shifting means including another winding of said inductor means; and feedback means for feeding back the output voltage of said ferroresonant transformer means to said phase shifting means.

10. An inverter circuit, comprising
a first pair of input terminals for a D.C. battery adapted to be charged by said inverter circuit;
a second pair of input terminals for an A.C. line voltage;
inductor means having a core and a plurality of windings inductively coupled to said core;
voltage divider means connected across said first pair of input terminals, said voltage divider means having taps connected to selected ones of the windings of said inductor means;
oscillator means for producing an A.C. voltage, said oscillator means having a tuning circuit for tuning said oscillator means to a selected frequency, said tuning circuit including a winding of said inductor means connected to said voltage divider means;
pulse shaping means coupled to said oscillator means for converting the A.C. voltage produced by said oscillator means to a substantially square wave, said pulse shaping means including parallel inverter means;
ferroresonant transformer means having a first winding, a second winding connected in series circuit arrangement with said first winding and having at least one intermediate tap thereon, said series circuit arrangement having an end at said first winding and an end at said second winding, a first series reactor connected to an intermediate tap on said second winding, a first input connected to said first series reactor and to the ends of said series circuit arrangement and coupled to the parallel inverter means of said pulse shaping means, a second series reactor connected to said intermediate tap on said second winding, a third series reactor connected to another intermediate tap on said second winding, a second input connected to said third series reactor and to the ends of said series circuit arrangement and coupled to said second pair of input terminals, and an output connected between the ends of said series circuit arrangement and said intermediate tap on said second winding;

means for deriving an output voltage from the output of said ferroresonant transformer means;

phase shifting means including another winding of said inductor means; and feedback means for feeding back the output voltage of said ferroresonant transformer means to said phase shifting means.

References Cited

UNITED STATES PATENTS

| | | | |
|---|---|---|---|
| 1,951,482 | 3/1934 | Holden | 307—64 |
| 3,229,111 | 1/1966 | Schumacher | 307—64 |
| 3,293,446 | 12/1966 | Baude | 307—64 |

ORIS L. RADER, *Primary Examiner.*

T. J. MADDEN, *Assistant Examiner.*